United States Patent [19]

Kay et al.

[11] Patent Number: 4,542,191
[45] Date of Patent: Sep. 17, 1985

[54] RUBBER ADDITIVES DERIVED FROM GUAYULE RESINS AND COMPOSITIONS CONTAINING THEM

[75] Inventors: Edward L. Kay, Akron; Richard Gutierrez, Canal Fulton, both of Ohio

[73] Assignee: The Firestone Tire & Rubber Company, Akron, Ohio

[21] Appl. No.: 312,197

[22] Filed: Oct. 19, 1981

Related U.S. Application Data

[63] Continuation-in-part of Ser. No. 298,447, Sep. 1, 1981, Pat. No. 4,435,337, and a continuation-in-part of Ser. No. 263,387, May 13, 1981, abandoned, and a continuation-in-part of Ser. No. 149,862, May 14, 1980, abandoned.

[51] Int. Cl.$^4$ ............................................. C08F 19/00
[52] U.S. Cl. .................................... 525/383; 525/344; 525/354; 525/502; 525/930
[58] Field of Search .......... 260/709, 728, 767, 768 R, 260/814; 525/383, 344, 502, 354, 930

[56] References Cited

U.S. PATENT DOCUMENTS 1,835,365 12/1931 Woodruff ............................ 260/768

FOREIGN PATENT DOCUMENTS 486878 6/1938 United Kingdom ................ 260/768

OTHER PUBLICATIONS

Chem. Abst., 42, 7082(b), 1948.
Chem. Abst., 47, 12862(b), 1953.

Primary Examiner—Christopher A. Henderson
Attorney, Agent, or Firm—Daniel N. Hall

[57] ABSTRACT

Tackifying agents for rubber comprising at least one chemically or physically treated guayule resin fraction are disclosed. Physical treatments include vacuum deoiling, steam stripping deoiling, hexane deoiling, while chemical treatments include formaldehyde reaction, phenol/formaldehyde reaction, urea formaldehyde reaction, acid reaction and sulphur reaction. Untreated guayule resin fractions can also be used. Vulcanized and unvulcanized rubber compositions containing guayule resin derived tackifying agents as well as articles made therefrom are also disclosed.

6 Claims, No Drawings

RUBBER ADDITIVES DERIVED FROM GUAYULE RESINS AND COMPOSITIONS CONTAINING THEM

CROSS REFERENCE TO RELATED APPLICATIONS

This application is a continuation-in-part of U.S. application Ser. No. 298,447 filed Sept. 1, 1981, now U.S. Pat. No. 4,435,337, and Ser. Nos. 263,387 filed May 13, 1981, now abandoned, and 149,862 filed May 14, 1980, now abandoned. The contents of each of these applications are hereby incorporated by reference in this application.

FIELD OF THE INVENTION

This invention relates to additives derived from guayule resins. While not necessarily restricted thereto, it more particularly relates to additive agents for rubber derived from guayule plant material which agents, optionally, have been further chemically or physically in treated. It also relates to vulcanized and unvulcanized rubber compositions containing these agents and articles made therefrom.

GENERAL BACKGROUND

The guayule plant, *Parthenium argentatum* Gray, which grows principally in the southwest United States and Mexico, is known as a potential domestic source of rubber. This plant also provides organic resinous material which is usually a by-product of rubber extraction. The term "guayule resin" is used herein to identify those constituents of the guayule plant (and similar rubber-containing plants) obtained when the plant itself, or resinous rubber prepared from it, is extracted with an oxygenated organic solvent such as acetone, ethyl alcohol and the like. This resinous fraction usually constitutes about 6–9% of the dry weight of the plant before processing. Material obtained by hydrocarbon solvent extraction of aged guayule shrub is also considered resin since it probably contains resin and resin-like low molecular weight rubber.

Since large amounts of rubber will probably be recovered from guayule and guayule-like plants in the future, it is clear that large amounts of guayule resin will become available. Therefore, uses for it and processes for converting it to useful materials will be of increasing interest.

One use for the resin and products made from it is as tackifiers and green strength improvers for rubber compositions. Tack, or more specifically building tack, is a desirable property of rubber. Simply stated, it is a measure of the ability of two unvulcanized rubbers to stick together during fabrication and prior to vulcanization. Related to tack is a rubber's uncured strength, usually called its "green strength." This property is also an important factor during manufacture of rubber articles such as hoses, tires, and belts. Green strength is a measure of an uncured rubber's ability to retain its shape prior to vulcanization (that is, to resist sag). Thus, it can be seen that both tack and green strength are significant properties in fabricating and handling unvulcanized rubber materials.

While natural rubbers (e.g., Hevea), in some instances, possesses sufficient inherent tack and green strength, it is often found that agents are desirably added to them to increase these properties. Synthetic rubbers often lack tack and/or green strength and it is common practice to add agents to them to correct such deficiencies (see, for example, U.S. Pat. No. 4,287,104 to Dimitri and Force).

BACKGROUND PRIOR ART

Guayule resin has been disclosed to be a source of fatty acids (for example, U.S. Pat. No. 2,744,125), esters and essential oils (U.S. Pat. No. 2,572,046). Chlorination of guayule resin has been reported; see Valero and Martinez, Anales Real Soc. Espan. Fis. Quim. (Madrid) Ser. B 58, 197–201 (1962). Guayule plants have been steam treated to yield various terpene fractions; see Haagen-Smit, et al., J. Amer. Chem. Soc., 66, 2068 (1944).

Two papers concerning guayule resin and its uses appear in the book "Guayule, riencuentio en al desleito" (1978). The paper by Winkler and Stephens describes guayule resin as a peptizing agent for Hevea rubber and styrene/butadiene rubber (SBR). It was found that guayule resin promotes reduction in the gel content of both Hevea and SBR. A second paper by Belmares and Jimenez describes the development of varnishes and adhesives from guayule resin. Mention is made of the use of the resin as a tackifier but it is not clear whether the tackifier described is for rubber or for varnishes and adhesives. No further discussion of any use of guayule resin as a tackifier is found. The Vanderbilt 1942 Rubber Handbook, page 16, states "6.Guayule. The high resin content renders this rubber very soft so that it is very seldom used alone. It is blended with other grades for friction stocks and other uses where its tackiness is valuable."

U.S. Pat. Nos. 4,136,131 and 4,159,903 to Buchanan and Balman, respectively, describe improved methods for isolating guayule rubber and enhancing its production. Early efforts to recover guayule rubber are described in U.S. Pat. No. 979,902 to Vanderlinde (1910).

Several classes of materials have been developed as rubber tackifiers. Such materials include rosins, coumarone resins, hydrocarbon-based polymeric resins and phenol/aldehyde condensates. Condensates of acetylene and tertiary butyl phenol have also been used as tackifying agents; see German Pat. Nos. 642,886, 645,112, 647,036 and 734,241. An extensive list of commercially available tackifying agents, including both trade names and chemical structures, appears in U.S. Pat. No. 4,284,542, particularly columns 3 and 4, which is incorporated by reference herein for this disclosure.

SUMMARY OF THE INVENTION

It has now been found that useful tackifying and green strength improving agents for rubber derived from guayule resins comprise at least one chemically or physically treated guayule resin fraction. Physical processes for treating such resin fractions include (i) vacuum deoiling, (ii) steam stripping deoiling, (iii) hexane deoiling and (iv) combinations of two or more of (i), (ii) and (iii). Chemical treatments of guayule resin for converting it to useful agents include (a) formaldehyde reaction, (b) phenol/formaldehyde reaction, (c) urea/formaldehyde reaction, (d) acid reaction and (e) sulphur reaction. Combinations of two or more of (a)–(e) can also be used. The resin can be both chemically and physically treated in any sequence to produce useful agents.

Tackifying and green strength improving agents also comprise at least one untreated guayule resin fraction obtained by solvent extraction of guayule plant materials. Such plant material can be (a) fresh whole shrub, (b) aged shrub, (c) fresh leaves, (d) or aged leaves. Combinations of two or more of (a)–(d) can also be used. Vulcanized and unvulcanized rubber compositions containing tackifying and green strength improving amounts of the aforedescribed agents are also within the scope of the invention as are articles made from such compositions.

DETAILED DESCRIPTION OF THE INVENTION

As noted above, guayule resins and methods for their isolation and purification are known to those of skill in the art. Among the plant materials that can be used as sources of guayule resins and guayule-like resins are a large number of plant species bearing rubber and rubber-like hydrocarbons including particularly Guayule itself (*Parthenium argentatum* Gray), Rabbit-Brush (*Crysothamnus nauseousus*), Rubbervine (*Cryptostegia grandiflora*), Milkweeds (*Asclepias incarnata, sublata, syriaca*, et al), Goldenrods (*Solidago altissima, graminifolia, leavenworthii, rigida*, et al), Sow thistles (*Sonchus arvensis oleraceous*, et al), Rosin Weeds (*Silphium species*), Mountain Mints (*Pycnanthemum species*), and *Cacalia atriplicifolia*. Many other plants which produce rubber and rubber-like hydrocarbons are known, particularly among the compositae, Euphorbiaceae, Labiatae, and Moraceae and it is probable that resins from these also will be useful in the invention.

The resin is usually isolated by solvent extraction of plant material. This extraction can be conducted in either a single-or multiple-step operation. Generally ground shrub is extracted with a first solvent which selectively removes resinous components, and then the deresinated shrub is extracted with a second solvent for rubber. Alternatively, the resin and rubber can be removed by a single extraction with a solvent for both, such as liquid hydrocarbons. In either case, the desired resin can be recovered from the solvent and/or rubber by conventional means.

Guayule shrub can be ground with any one of the known mill units; these include hammermills, roll mills, stone mills, ball mills and pulp mills. The plant material from which the resins used in this invention can be isolated include whole plants (including pollarded plants) as well as parts of plants such as stems, branches, leaves, roots, etc. The plant material can be used fresh directly as harvested or it can be aged.

Typically, the resins used in this invention are isolated by solvent extraction of the plant material with oxygenated organic solvent. Usually these solvents contain one to about eight carbon atoms and are chemically classified as alcohols, ketones, esters, and ethers. Specific examples include methanol, ethanol, propanol, acetone, methyl ethyl, ketone, ethyl acetate, diethyl ether, etc. Combinations of oxygenated solvents can also be used. Hydrocarbons containing five to about ten carbon atoms can be used to isolate some resin fractions and resinous rubber as can be mixtures of oxygenated and hydrocarbon solvents. Resin micella containing about 4–30% resin and one or more of the aforedescribed extraction solvents are also useful. Typically, the extraction solvent is an oxygenated organic solvent such as ethanol, acetone or propanol or mixtures thereof.

While untreated crude guayule resin can be used as tackifying agents and green strength improvers for rubber it is also possible to chemically and/or physically treat the resin to produce useful additives for rubber. Physical processes for treating the resin include a vacuum deoiling wherein the resin is subjected to a vacuum of about 1–200 torr at a temperature of about 20°–150° until approximately 0.1–10% evaporates. This process removes volatile oils which often cause undesirable odors, stains and excessive softening when present.

Such oils can also be removed by steam stripping the resin wherein water aids volatilization of the oil. Oil can also be removed by extraction with an oil solvent such as hexane. The hexane used is not necessarily pure but can often be a commercial hydrocarbon fraction having a boiling range in the range of about 20°–100° C. Combinations of these physical processes, in any order, can be used to physically treat the guayule resin.

Guayule resin can also be chemically treated in at least one chemically reactive process. A typical such process is formaldehyde reaction wherein the resin is treated with formaldehyde. Generally this treatment is carried out at a temperature of about 15°–150° and the proportions by weight of formaldehyde to resin are in the range of about 0.1–1.0 mole formaldehyde to 100 parts resin. For the purposes of this invention, formaldehyde includes formaldehyde-containing and -producing substances such as formalin, paraformaldehyde, trioxane, methylal and the like which yield formaldehyde or formaldehyde-like materials under the reaction conditions.

Phenol/formaldehyde reaction can also be used to chemically treat the resins used in this invention. Phenol includes phenol itself ($C_6H_5OH$) as well as hydroxy aromatic compounds containing a hydroxyl group directly bonded to a carbon of an aromatic ring. Thus toluol, xylols and various alkyl substituted phenols are within the scope of the term "phenol" as used herein. Phenol/formaldehyde reactions are carried out with ratios of phenol:formaldehyde:resin in the ranges of about 0.01–2.0 moles: 0.01–3.0 moles=100 parts. Reaction temperatures of about 15°–150° are used.

Urea/formaldehyde reactions can also be used to chemically treat guayule resins. Both urea and thiourea can be used as well as monosubstituted ureas having aromatic and/or alkyl substituents of one to seven carbon atoms. Typically, for reasons of convenience and economy, urea itself is used. Urea/formaldehyde reactions are carried out at temperatures between about 15°–150° using ratios of urea: formaldehyde: resin of about 0.01–1.0 moles: 0.01–4.0 moles=100 parts.

Acid reactions can also be used to chemically treat guayule resins. Such acid reactions include reaction with strong mineral acids such as sulphuric and phosphoric acid and the like. Reaction with non-protonic acids such as Lewis acids (e.g., $AlCl_3$ and $BF_3$) and the like can also be used under essentially anhydrous conditions. Reaction occurs at temperatures of about 0°–150°. Generally a catalytically effective amount of acid is used. Usually, the acid reaction products are washed or otherwise neutralized before use in rubber.

Sulphur reactions can also be used to chemically treat guayule resins to produce agents for rubber. In such reactions elemental sulphur is reacted in a weight ratio of about 0.1–25 parts sulphur to 100 parts resin at temperatures ranging from about 15°–150°.

Combinations of two or more of the aforedescribed chemically reactive processes can also be used to treat guayule resins. Useful additives can also be made by both chemically and physically treating the same resin sample in any sequence. Thus, for example, a resin can be vacuum deoiled and then treated by acid reaction or reacted with sulphur and then steam stripped or deoiled. Many such variations are within the skill of the art.

The agents of this invention are used in unvulcanized rubber compositions comprising a major amount of uncured rubber and a tackifying or green strength improving amount of the agent. Generally, this amount will be about 1–50 parts agent per 100 parts rubber (phr). Typically, it will be about 1–30 phr. These rubber compositions can also contain other conventional additives for rubber such as fillers, accelerators, stabilizers, pigments and the like.

The rubber used in this invention includes both the elastic, naturally occurring hydrocarbon polymer of isoprene having a predominantly cis-1,4 structure (e.g., Hevea, Guayule rubber) and rubber-like polymeric hydrocarbons of the synthetic variety. Among the synthetic rubbers which can be beneficially treated by the agents of this invention are polybutadiene, polyisoprene, ethylene/propylene/diene terpolymers, butadiene/styrene copolymers, butadiene/acrylonitrile copolymers and terpolymers, chloroprene, chlorosulphonated polyethylene and mixtures of any two or more of the aforementioned. Other synthetic rubbers as well as synthetic natural rubber mixtures can also benefit from the practice of this invention. When the agent is totally untreated, crude guayule resin, the rubber comprises at least one rubber which is not guayule rubber.

The agents of this invention are combined with the rubber using convenient, conventional techniques, conditions and machinery.

This invention includes vulcanized rubber compositions made by vulcanizing the inventive uncured rubber compositions. Articles made from such vulcanized rubber compositions are also within the scope of the invention. Such articles include tires, belts, hoses and the like as well as parts of such articles such as treads, undertreads, sidewalls, bodies, innerliners and the like.

The resin-derived agents of this invention can also be usefully combined with water-soluble fractions obtained by water extraction of guayule plants. These fractions, which are generally believed to be saccharides, are combined with treated or untreated resin in the ratio of about 0.1–20 parts water-soluble fraction to 100 parts resin.

EXAMPLES

The following examples are representative of the invention. In them, as elsewhere in this specification and appended claims, all parts, percentages and ratios are by weight and all temperatures are degrees centigrade unless otherwise specified.

The experimental resin tackifiers described below are evaluated in standard rubber formulations comprising a commercial SBR synthetic rubber containing some natural Hevea rubber and the usual amounts of carbon black, zinc oxide, stearic acid, sulphur, vulcanization accelerator and stabilizer. A commercial tackifying agent for rubber sold by the Hercules Company (USA) under the name Piccopale 100 is used for comparative purposes. It has been described as a polymerized petroleum resin.

The inventive guayule resin-derived tackifying agents are evaluated using the well-known Instron test apparatus for measuring tack and green strength. The tack values are obtained by noting the force required to pull two strips of unvulcanized compounded stock apart. Absolute values are expressed in pounds force per linear inch of test specimen. Controls are routinely tested with the inventive tackifying agents to compare tack values on different sets of resins, both inventive and control. Tack values are expressed as "a tack index." This index is the numerical value obtained by dividing the absolute tack value observed with the inventive resin by the absolute value obtained on a control tested at the same time. Thus, the tack index of the control is always 1.0 while the tack index of inventive tackifying agents can vary with numbers greater than one being better than the control.

Green strengths are reported as uncured tensile strength using conventional units of pounds force per square inch (psi). Green strength values for "initial peak and break" are presented to more completely describe the stress/strain properties of uncured stocks. The "maximum percent elongation" values are reported for the sake of complete disclosure. Higher values are, of course, desirable.

Compounded rubber formulations containing the inventive tackifying agents are also evaluated in the Monsanto rheometer test apparatus to determine if the agents would have any significant adverse effects on vulcanization rate and state of cure.

A Monsanto Rheometer is used in these standard tests, with the specific conditions employed being: operating at 100 rpm; use of the mini-die attachment in the apparatus, and the effecting of a one degree arc at 140° C. during the test procedure.

The reasons for the use of the rheometer test, as is well known, are plain and fundamentally sound. Rheometer data are based on torque measurements. The lowest torque value (Min) is an indication of the amount of energy to just mix the compound prior to the onset of vulcanization. The highest torque value (Max) is an indication of the state of cure after the vulcanization reaction has been completed. Torque values are expressed in "inch-pound" units and can be converted to "SI" units of Newton-meters (N-m) by multiplying the inch-pound values by 1.129848.

Additional valuable and informative rheometer data are "Ts" values which are the times to scorch (that is, the time measured in minutes to achieve a two-torque unit rise) and the "Tc" which is the time in minutes required to achieve a 90% cure state.

A "Cure Rate Index" (CRI) is also generated from the rheometer data. The "CRI" is defined as:

$$\frac{1}{(Tc - Ts)} \times 100$$

and is indicative of the rate of vulcanization, e.g., the rate of reaction.

The rheometer data are summarized in Tables II and IV which follow.

Guayule resin was obtained by standard techniques which have been described in the prior art and elsewhere. See, for example, the U.S. applications, Ser. Nos. 298,447, 263,387 and 149,862 noted above.

EXAMPLE I

Vacuum Deoiling

Essential oils are removed from crude guayule resin by heating at about 40°–90° under a vacuum of 125 torr; the residue is relatively oil-free and can be used as a tackifying agent. It is identified as GR-1. As shown by the data summarized in Table I, the standard rubber compound containing GR-1 has tack and green strength values comparable to the control. The tack index value of GR-1 is lower than the control but is considered adequate for some industrial applications. Reometer data on rubber compositions shown in Table II indicate that the GR-1 treated rubber is comparable to the control sample.

EXAMPLE II

The same crude resin used in Example I is deoiled by steam stripping. The residue obtained is a steam stripped tackifying agent identified in Table I as GR-2. A standard rubber composition containing it exhibits a slightly higher tack index value than GR-1. The green strength data on GR-2 are comparable to those obtained with the control sample. Data shown in Table II are also equivalent to those obtained with the control sample.

EXAMPLE III

Treatment by Formaldehyde Reaction

Crude guayule resin is reacted with 37% aqueous formaldehyde in the ratio of 0.6 mole formaldehyde per 100 parts resin. The reaction is continued for two days at ambient temperature. The aqueous layer is decanted and the formaldehyde treated resin dried by passing air over it. This air-dried formaldehyde-treated resin is identified as GR-3. As shown in Table I, the tack index value of rubber containing GR-3 was 0.9, showing a tack almost equivalent to that provided by the control, Piccopale 100. Green strength values on GR-3 are better than the corresponding values on the control. Rheometer data summarized in Table II further demonstrate the utility of GR-3.

EXAMPLE IV

Treatment by Formaldehyde of Resin Micella

Resin micella (an acetone solution of the resin obtained by extracting guayule shrub with acetone) is reacted with aqueous formaldehyde at ambient temperature. The amount of formaldehyde is 0.5 mole per 100 parts crude resin. Reaction is continued for one hour. The modified resin is recovered and dried as in Example III and the dried, chemically treated resin identified as GR-4. As shown in Table I, GR-4 imparted more tack to a rubber sample than did Piccopale 100. Green strength data confirm that GR-4 is somewhat better than the commercial control. The rheometer data on GR-4 are comparable to those of the commercial control as shown in Table II.

EXAMPLE V

Formaldehyde Treatment of Steam Stripped Resin

Guayule resin (100 parts) is steam stripped and dissolved in acetone and the acetone solution treated with 0.5 mole of formaldehyde as a 37% aqueous solution. After one hour the physically and chemically treated resin is recovered as in Example III and identified as GR-5. As shown in Table I, GR-5 containing rubber exhibits a tack index value of 1.1, intermediate between the values for GR-3 and GR-4. Green strength and rheometer data (see Table II) are comparable to those provided by the commercial control.

EXAMPLE VI

Chemical Treatment of Resin by Phenol/Formaldehyde Reaction

Crude guayule resin is treated with a combination of phenol and formaldehyde; 0.137 moles of phenol and 0.137 moles formaldehyde, are used to treat 100 parts of resin. The temperature and reaction conditions are those described in Examples III and V. The recovered, treated resin is identified as GR-6. As shown in Tables I and II tack index and green strength values for the sample containing GR-6 are better than those containing the control. Table II shows that the rheometer data are comparable.

EXAMPLE VII

Chemical Treatment of Resin With Urea/Formaldehyde

Crude guayule resin is treated with urea and formaldehyde under conditions comparable to those used in Example VI. The treated resin tackifying agent is identified as GR-7. As shown in Tables I and II the data obtained with GR-7 are comparable with those obtained using the control.

EXAMPLE VIII

Hexane Extraction of Aged Guayule Shrub

Aged guayule shrub is ground and extracted with hexane using the procedures described in applications U.S. Ser. Nos. 298,447, 263,387 and 149,862. The hexane extract from the aged shrub is stripped of hexane and other volatiles by vacuum deoiling. The isolated resinous product is identified as GR-8.

As shown in Table I the tack and green strength of rubber samples containing GR-8 compares favorably with that of samples containing the commercial control. It is believed that GR-8, in addition to resin, contains low molecular weight guayule rubber produced by aging of the bush before extraction. This is suggested by the rheometer data recorded in Table II. The maximum torque value of 40.7 is somewhat higher than the value of 39.8 obtained with a sample containing the commercial control A.

EXAMPLE IX

Formaldehyde Treatment of GR-8

The procedure of Example III is used to treat the resin isolated in Example 8. The formaldehyde-treated resin is identified as GR-9. As shown by the data summarized in Tables I and II, slightly improved values are obtained with rubber samples containing GR-9.

EXAMPLE X

Chemical Treatment by Acid Reaction of Guayule Resin

Sulphuric acid is used to treat guayule resin; 5.0 parts of 98% sulfuric acid are used to treat 260 parts of crude resin contained in one liter water. After reaction at 95–100 degrees for 2.5 hours, the sample is stripped of about 400 cc water (1.25 hours), cooled and the residual resin, washed well and dried. The air-dried product is identified as GR-10. The data summarized in Tables I and II indicate that rubber samples containing GR-10 exhibit tack, green strength and rheometer values which compare favorably with samples containing the commercial control.

EXAMPLE XI

Fresh guayule shrub is ground and then extracted with hexane in the manner described in application Ser. Nos. 298,447, 263,387 and 149,862. The product is identified as GR-11. The data summarized in Table I show that GR-11 containing rubber samples have tack values somewhat less than those containing GR-8 (the hexane extract of aged guayule shrub). The results indicate, however, that GR-11 has potential commercial value.

EXAMPLE XII

Acetone Extraction of Aged Guayule Shrub

The aged guayule shrub described in Example 8 is ground and extracted with acetone according to the procedures described in earlier applications. The extract is isolated and dried in the usual manner and identified as GR-12. As shown in Table I, a rubber sample containing GR-12 exhibits a tack index value of 2.8.

EXAMPLE XIII

Inclusion of Water Soluble Fractions in a Tackifying Agent

The water soluble fraction obtained by water extraction of guayule shrub is added to the crude guayule resin in the amount of 29 parts water soluble fraction to 165 parts crude resin. After removal of water by evaporation, the product is found to be less sticky and harder than the resin itself. The product is identified as GR-13. Evaluation using standard techniques shows that rubber samples containing GR-13 exhibit tack and green strength values as well as cure properties comparable to those of rubber samples containing the commercial control (See Tables I and II).

EXAMPLE XIV

Solvent-Deoiled Guayule Resin

Crude guayule resin is deoiled with hexane. The hexane-insoluble residue is recovered and identified as GR-14. The test data shown in Table I illustrate that a rubber stock containing GR-14 had better tack and green strength than one containing the commercial control. Table II data show that they are comparable with respect to rheometer measurements.

EXAMPLE XV

Chemical Treatment by Sulphur Reaction

Guayule resin is reacted with sulphur by heating crude resin with elemental sulphur (160 parts resin per 20 parts sulphur) at about 100°–144° for about 0.75 hours to prepare a sulfur-modified resin of about 11% sulfur. Hydrogen sulphide is evolved during the reaction. The reaction is terminated by cooling the mixture after it appears to be homogeneous. A series of experiments shows that as the sulphur content of sulphur-treated guayule resin is increased the treated resin becomes more brittle.

Sulphur-treated resin tackifying agents are prepared containing nominally 5, 11 and 20% sulphur. These are identified as GR-15-A (5%), GR-15-B (11%) and GR-15-C (20%). As shown in Table I, the tack index and green strength values on GR-15-A, B and C in rubber are significantly higher than the values obtained with a sample containing the commercial control. The data in Table II show that rubber samples containing sulphur-treated guayule resin had very high maximum torque values.

EXAMPLE XVI

Resin Isolated from Guayule Leaves

Aged guayule leaves obtained by defoliation of guayule shrub prior to rubber-recovery are extracted with acetone. The acetone extract is then deoiled by steam stripping. The recovered acetone extracted, steam-stripped resin is identified as GR-16. GR-16 is mixed with the standard rubber formulation at 5.0 phr, 10.0 phr and 15 phr to determine the effect of tackifying agent concentration on tack and green strength. The values obtained are summarized in Table III. As shown, the tack index values obtained with all GR-16 samples are significantly higher than the value obtained with a rubber containing the commercial control. Green strength values are also better than those obtained with the commercial control. Rheometer data on samples containing GR-16 (Table IV) compare very favorably with samples containing the commercial control.

Because some of the agents made according to the present invention are sticky in concentrated form it is often desirable to dilute them with extender oils and/or other solvents before using them in compounding. Such techniques merely facilitate their use. Alternatively, resins can be conveniently absorbed onto fillers such as carbon black to give relatively free-flowing, dry formulations which then can be compounded in rubber to provide the desired property. Since it is known that rubber tackifying agents are sometimes desirably non-staining to white sidewall tire stocks, a tackifying agent made according to the general procedure outlined in Example III is formulated in a rubber stock and cured to provide a standard white sidewall rubber tire stock. The cured strips are then exposed to ultraviolet irradiation and examined after 4, 16 and 24 hours. This examination shows that the inventive tackifying agents based on guayule resins can be essentially non-staining.

While the invention has been described and exemplified herein by reference to specific materials, machinery, techniques, procedures and examples, it is understood that it is not restricted to these. Numerous variations, combinations and permutations can be made within the scope of the invention, as is clear to those skilled in the art.

TABLE I

| | TACK AND GREEN STRENGTH DATA | | | | |
|---|---|---|---|---|---|
| | Tack | Green Strength Data, psi | | | Maximum |
| Sample | Index | Initial | Peak | Break | % Elongation |
| Control-A | 1.0 | 50 | 58 | 0 | 400 |
| GR-1 | 0.4 | 51 | 55 | 15 | 330 |
| GR-2 | 0.5 | 53 | 58 | 10 | 485 |
| GR-3 | 0.9 | 53 | 62 | 12 | 860 |
| GR-4 | 1.4 | 60 | 67 | 23 | 705 |
| GR-5 | 1.1 | 60 | 65 | 25 | 820 |
| GR-6 | 1.5 | 58 | 64 | 24 | 920 |
| GR-7 | 1.2 | 60 | 65 | 20 | 610 |
| GR-8 | 0.9 | 46 | 53 | 0 | 435 |
| GR-9 | 1.0 | 45 | 51 | 0 | 550 |
| Control-B | 1.0 | 45 | 52 | 6 | 575 |
| GR-10 | 0.6 | 60 | 60 | 8 | 480 |
| GR-11 | 0.6 | 51 | 51 | 22 | 483 |
| Control-C | 1.0 | 51 | 59 | 2 | 670 |
| GR-12 | 2.8 | 60 | 69 | 26 | 930 |
| GR-13 | 1.1 | 69 | 69 | 6 | 485 |
| Control-D | 1.0 | 46 | 58 | 28 | 940 |
| Control-E | 1.0 | 37 | 50 | 0 | 505 |
| GR-14 | 2.5 | 100 | 105 | NB | 1250 |
| GR-15-A | 2.9 | 66 | 71 | NB | 1250 |

TABLE I-continued

TACK AND GREEN STRENGTH DATA

| Sample | Tack Index | Green Strength Data, psi | | | Maximum % Elongation |
|---|---|---|---|---|---|
| | | Initial | Peak | Break | |
| GR-15-B | 1.8 | 60 | 73 | NB | 1250 |
| GR-15-C | 3.5 | 68 | 105 | NB | 1250 |

Control-A-compounded and tested at the same time as experimental samples GR-1 to GR-9, inclusive.
Control-B-compounded and tested at the same time as experimental samples GR-10, 11 and 13.
Control-C-compounded and tested at the same time as experimental samples GR-12, 15-A and 15-C.
Control-D-compounded and tested at the same time as experimental sample GR-15-B.
Control-E-compounded and tested at the same time as experimental sample GR-14.
NB-measured no break, indicative of good green strength.

TABLE II

RHEOMETER DATA

| Sample | Ts | Tc | Torque | | CRI |
|---|---|---|---|---|---|
| | | | Min. | Max. | |
| Control-A | 15.4 | 24.0 | 5.2 | 39.8 | 11.6 |
| GR-1 | 11.3 | 17.3 | 4.5 | 31.5 | 16.7 |
| GR-2 | 11.7 | 17.7 | 5.2 | 32.9 | 16.7 |
| GR-3 | 12.6 | 19.0 | 5.5 | 33.5 | 15.6 |
| GR-4 | 12.0 | 18.9 | 5.8 | 33.2 | 14.5 |
| GR-5 | 12.0 | 18.8 | 5.4 | 33.4 | 14.7 |
| GR-6 | 11.6 | 17.3 | 5.4 | 31.3 | 17.5 |
| GR-7 | 11.4 | 18.0 | 5.4 | 32.5 | 15.2 |
| GR-8 | 14.0 | 22.0 | 5.8 | 40.7 | 12.5 |
| GR-9 | 14.0 | 21.8 | 5.5 | 39.8 | 12.8 |
| Control-B | 8.0 | 16.3 | 4.8 | 37.4 | 12.0 |
| GR-10 | 7.4 | 16.3 | 4.4 | 37.4 | 11.2 |
| GR-11 | 7.6 | 15.0 | 5.2 | 41.0 | 13.5 |
| Control-C | 15.5 | 25.7 | 6.7 | 42.8 | 9.8 |
| GR-12 | 10.3 | 18.0 | 8.8 | 38.2 | 13.0 |
| GR-13 | 5.6 | 12.6 | 5.2 | 33.1 | 14.3 |
| Control-D | 8.3 | 17.2 | 9.3 | 46.2 | 11.2 |
| Control-E | 11.0 | 18.0 | 6.2 | 43.3 | 14.3 |
| GR-14 | 7.0 | 12.9 | 9.6 | 43.8 | 16.9 |
| GR-15-A | 7.3 | 14.3 | 7.9 | 43.2 | 14.3 |
| GR-15-B | 5.6 | 11.6 | 9.8 | 58.0 | 16.7 |
| GR-15-C | 5.2 | 11.9 | 9.4 | 59.6 | 14.9 |

Control-A-compounded and tested at the same time as experimental samples GR-1 to GR-9, inclusive.
Control-B-compounded and tested at the same time as experimental samples GR-10, 11 and 13.
Control-C-compounded and tested at the same time as experimental samples GR-12, 15-A and 15-C.
Control-D-compounded and tested at the same time as experimental sample GR-15-B.
Control-E-compounded and tested at the same time as experimental sample GR-14.

TABLE III

TACK AND GREEN STRENGTH DATA
Effect of Concentration

| Sample | Tack Index | Green Strength Data, psi | | | Maximum % Elongation |
|---|---|---|---|---|---|
| | | Initial | Peak | Break | |
| Control 17 phr | 1.0 | 48 | 58 | 10 | 690 |
| Experimental | | | | | |
| GR-16  5 phr | 2.5 | 49 | 56 | 19 | 1015 |
| 10 phr | 2.0 | 61 | 69 | 26 | 912 |
| 15 phr | 2.6 | 63 | 72 | 48 | 1250 |

TABLE IV

RHEOMETER DATA
Effect of Concentration

| Sample | Ts | Tc | Torque | | CRI |
|---|---|---|---|---|---|
| | | | Min. | Max. | |
| Control | 9.3 | 16.6 | 7.2 | 45 | 13.7 |
| Experimental | | | | | |
| GR-16  5 phr | 11.2 | 19.2 | 8.0 | 44.3 | 12.5 |
| 10 phr | 9.4 | 14.7 | 9.5 | 50.1 | 18.9 |
| 15 phr | 8.6 | 14.0 | 9.6 | 46.2 | 18.5 |

What is claimed is:

1. A tackifying and green strength improving agent for rubber comprising of at least one chemically treated guayule resin fraction.

2. The agent of claim 1 wherein the resin is chemically treated by at least one chemically reactive process chosen from the group consisting of (A) formaldehyde reaction, (B) phenol/formaldehyde reaction, (C) urea/formaldehyde reaction, (D) acid raaction, (E) sulphur reaction, and (F) combinations of two or more of (A)-(E).

3. The agent of claim 2 wherein the chemically reaction process is (A) formaldehyde reaction.

4. The agent of claim 3 wherein the treatment is carried out at a temperature of about 15°-150° C. and the proportions by weight of formaldehyde to resin are in the range at about 0.1-1.0 mole of formaldehyde to 100 parts resin.

5. The agent of claim 3 wherein the formaldehyde includes formaldehyde, and formaldehyde—containing and—producing substances.

6. The agent of claim 5 wherein the formaldehyde—containing and—producing substances are selected from the group consisting of formalin, paraformaldehyde, trioxane and methylal.

* * * * *